US012739867B2

(12) United States Patent
Park et al.

(10) Patent No.: US 12,739,867 B2
(45) Date of Patent: Sep. 15, 2026

(54) RESOURCE SELECTION UNDER CONGESTED CONDITIONS

(71) Applicant: QUALCOMM Incorporated, San Diego, CA (US)

(72) Inventors: Cheol Hee Park, San Diego, CA (US); Yue Yin, Beijing (CN); Guibing Gu, Shanghai (CN); Shuping Chen, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 502 days.

(21) Appl. No.: 18/040,770

(22) PCT Filed: Sep. 23, 2021

(86) PCT No.: PCT/CN2021/119756

§ 371 (c)(1),
(2) Date: Feb. 6, 2023

(87) PCT Pub. No.: WO2022/063148

PCT Pub. Date: Mar. 31, 2022

(65) Prior Publication Data

US 2023/0362972 A1 Nov. 9, 2023

(51) Int. Cl.
*H04W 72/542* (2023.01)
*H04W 72/11* (2023.01)
*H04W 72/53* (2023.01)

(52) U.S. Cl.
CPC .......... *H04W 72/542* (2023.01); *H04W 72/11* (2023.01); *H04W 72/53* (2023.01)

(58) Field of Classification Search
CPC ..... H04W 72/02; H04W 72/40; H04W 72/52; H04W 72/54–543
See application file for complete search history.

(56) References Cited

U.S. PATENT DOCUMENTS

2019/0373502 A1 12/2019 Chae et al.
2019/0373637 A1 12/2019 Lee et al.
(Continued)

FOREIGN PATENT DOCUMENTS

CN 106961690 A 7/2017
CN 108594819 A 9/2018
(Continued)

OTHER PUBLICATIONS

Supplementary European Search Report—EP218715175—Search Authority—The Hague—Aug. 27, 2024.
Huawei, et al., "Correction on Resource (Re)Selection," 3GPP TSG-RAN WG2 Meeting #111-e, R2-2007916, Electronic, Aug. 17-28, 2020, (Aug. 28, 2020), the whole document, 8 pages.
International Search Report and Written Opinion—PCT/CN2020/117057—ISA/EPO—Jun. 21, 2021.
International Search Report and Written Opinion—PCT/CN2021/119756—ISA/EPO—Dec. 15, 2021.
(Continued)

*Primary Examiner* — Pao Sinkantarakorn
*Assistant Examiner* — Pawaris Sinkantarakom
(74) *Attorney, Agent, or Firm* — Holland & Hart LLP

(57) ABSTRACT

Methods, systems, and devices for wireless communications are described. A user equipment (UE) may identify a message to be transmitted over a wireless channel, such as a vehicle-to-everything (V2X) system. The UE may determine a channel reservation limit for reserving resources on the wireless channel for the message based on a channel busy ratio for the wireless channel. The UE may determine that available resources are insufficient for both an initial transmission of the message and a retransmission of the message based on the channel reservation limit. The UE may reserve a resource on the wireless channel for the initial transmission of the message based on the available resources being insufficient for both the initial transmission of the message and the retransmission of the message.

24 Claims, 9 Drawing Sheets

(56) References Cited

U.S. PATENT DOCUMENTS

| | | | | |
|---|---|---|---|---|
| 2021/0219268 | A1* | 7/2021 | Li | H04B 17/318 |
| 2021/0385822 | A1* | 12/2021 | Chae | H04W 72/02 |
| 2022/0209905 | A1* | 6/2022 | Han | H04L 1/1887 |
| 2022/0361151 | A1* | 11/2022 | Ding | H04W 72/0446 |

FOREIGN PATENT DOCUMENTS

| | | | |
|---|---|---|---|
| CN | 110249690 | A | 9/2019 |
| CN | 110972102 | A | 4/2020 |
| CN | 110999446 | A | 4/2020 |
| EP | 3473044 | A1 | 4/2019 |
| EP | 3592023 | A1 | 1/2020 |
| WO | WO-2018030825 | A1 | 2/2018 |
| WO | WO-2020033088 | A1 | 2/2020 |
| WO | WO-2020033422 | A1 | 2/2020 |
| WO | WO-2020102177 | A1 | 5/2020 |

OTHER PUBLICATIONS

OPPO: “Discussions on Resource Reservation, Sensing and Selection in Mode 2,” 3GPP TSG-RAN WG1 Meeting #99, R1-1912794, Reno, USA, Nov. 18-22, 2019, (Nov. 22, 2019), the whole document, 12 pages.

Samsung: “Remaining Details on Congestion Control,” 3GPP TSG RAN WG1 #88, R1-1702866, Athens, Greece Feb. 13-17, 2017, (Feb. 17, 2017), sections 1-3, 4 pages.

Qualcomm Incorporated: “Resource Reselection Counter and Triggering Conditions”, 3GPP TSG-RAN WG1 Meeting #88, R1-1702520, Athens, Greece, Feb. 13-17, 2017, 3 Pages.

* cited by examiner

600

RESOURCE SELECTION UNDER CONGESTED CONDITIONS

CROSS REFERENCE TO RELATED APPLICATION

The present Application is a 371 national stage filing of International PCT Application No. PCT/CN2021/119756 by Park et al. entitled "RESOURCE SELECTION UNDER CONGESTED CONDITIONS," filed Sep. 23, 2021; and claims priority to International Patent Application No. PCT/CN2020/117057 by Yin et al., entitled "RESOURCE SELECTION UNDER CONGESTED CONDITIONS," filed Sep. 23, 2020, each of which is assigned to the assignee hereof, and each of which is expressly incorporated by reference in its entirety herein.

FIELD OF TECHNOLOGY

The following relates to wireless communications, including resource selection under congested conditions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, such as vehicle-to-everything (V2X) systems, a UE may reserve resources on a wireless channel to send messages.

SUMMARY

The described techniques relate to improved methods, systems, devices, and apparatuses that support resource selection under congested conditions. Generally, the described techniques provide for efficiently reserving wireless resources in a wireless communications system, such as a vehicle-to-everything (V2X) wireless communications system. In some V2X wireless communications systems, a V2X device, such as a vehicle user equipment (UE), may reserve resources for communications on a V2X wireless channel. In some V2X wireless communications systems, a V2X device may be limited to reserving a certain number of resources on a wireless channel based on a channel busy ratio (CBR) of the wireless channel. A wireless communications system described herein supports techniques for a UE to improve spectral efficiency and reduce a packet error loss when there is a channel reservation limit. For example, when a UE has a message to transmit on a V2X wireless channel, the UE may determine the CBR of the wireless channel and determine a channel reservation limit based on the CBR. If the UE is limited to a number of available resources such that the UE cannot reserve sufficient resources for both an initial transmission and a retransmission, the UE may not reserve resources for the retransmission. The UE may then reserve resources for the initial transmission, and the UE may transmit the application packet using the resources for the initial transmission.

A method for wireless communications at a UE is described. The method may include identifying a message to be transmitted over a wireless channel, determining a channel reservation limit for reserving resources on the wireless channel for the message based on a channel busy ratio for the wireless channel, determining that available resources are insufficient for both an initial transmission of the message and a retransmission of the message based on the channel reservation limit, and reserving a resource on the wireless channel for the initial transmission of the message based on the available resources being insufficient for both the initial transmission of the message and the retransmission of the message.

An apparatus for wireless communications at a UE is described. The apparatus may include a processor, memory in electronic communication with the processor, and instructions stored in the memory. The instructions may be executable by the processor to cause the apparatus to identify a message to be transmitted over a wireless channel, determine a channel reservation limit for reserving resources on the wireless channel for the message based on a channel busy ratio for the wireless channel, determine that available resources are insufficient for both an initial transmission of the message and a retransmission of the message based on the channel reservation limit, and reserve a resource on the wireless channel for the initial transmission of the message based on the available resources being insufficient for both the initial transmission of the message and the retransmission of the message.

Another apparatus for wireless communications at a UE is described. The apparatus may include means for identifying a message to be transmitted over a wireless channel, means for determining a channel reservation limit for reserving resources on the wireless channel for the message based on a channel busy ratio for the wireless channel, means for determining that available resources are insufficient for both an initial transmission of the message and a retransmission of the message based on the channel reservation limit, and means for reserving a resource on the wireless channel for the initial transmission of the message based on the available resources being insufficient for both the initial transmission of the message and the retransmission of the message.

A non-transitory computer-readable medium storing code for wireless communications at a UE is described. The code may include instructions executable by a processor to identify a message to be transmitted over a wireless channel, determine a channel reservation limit for reserving resources on the wireless channel for the message based on a channel busy ratio for the wireless channel, determine that available resources are insufficient for both an initial transmission of the message and a retransmission of the message based on the channel reservation limit, and reserve a resource on the wireless channel for the initial transmission of the message based on the available resources being insufficient for both the initial transmission of the message and the retransmission of the message.

In some examples of the method, apparatuses, and non-transitory computer-readable medium described herein, determining that available resources may be insufficient may include operations, features, means, or instructions for determining a number of available subchannels for the message based on the channel reservation limit, and determining the number of available subchannels may be insufficient for both the initial transmission of the message and the retransmission of the message.

In some examples of the method, apparatuses, and non-transitory computer-readable medium described herein, determining that available resources may be insufficient may include operations, features, means, or instructions for determining the number of available subchannels for the message based on granted resources for one or more event-driven transmissions.

In some examples of the method, apparatuses, and non-transitory computer-readable medium described herein, determining that available resources may be insufficient may include operations, features, means, or instructions for determining the number of available subchannels for the message based on a channel occupancy ratio within a channel occupancy ratio evaluation window, the channel occupancy ratio evaluation window comprising a first portion of past resources and a second portion of future resources.

In some examples of the method, apparatuses, and non-transitory computer-readable medium described herein, determining that available resources may be insufficient may include operations, features, means, or instructions for determining a first number of available subchannels for the message based on a first channel reservation limit, determining the first number of available subchannels is insufficient for both the initial transmission of the message and the retransmission of the message, determining a second number of available subchannels for the message based on a second channel reservation limit and the first number of available subchannels being insufficient; and determining the second number of available subchannels is insufficient for both the initial transmission of the message and the retransmission of the message, and is sufficient for the initial transmission of the message.

Some examples of the method, apparatuses, and non-transitory computer-readable medium described herein may further include operations, features, means, or instructions for determining the channel busy ratio for the wireless channel based on a received signal strength indicator measurement of the wireless channel.

In some examples of the method, apparatuses, and non-transitory computer-readable medium described herein, the channel reservation limit may be based on a priority of the message.

In some examples of the method, apparatuses, and non-transitory computer-readable medium described herein, the channel reservation limit corresponds to a number of subchannels that a wireless device may be permitted to reserve for transmission for a duration of time.

In some examples of the method, apparatuses, and non-transitory computer-readable medium described herein, the available resources may be determined based on a duration of a semi-persistent scheduling period and the channel reservation limit.

Some examples of the method, apparatuses, and non-transitory computer-readable medium described herein may further include operations, features, means, or instructions for refraining from reserving a retransmission resource based on determining that available resources may be insufficient.

In some examples of the method, apparatuses, and non-transitory computer-readable medium described herein, the wireless channel includes a V2X channel.

DETAILED DESCRIPTION

Some wireless communications systems may support vehicle-to-everything (V2X) communications. In some V2X wireless communications systems, a V2X device, such as a vehicle user equipment (UE), may reserve resources for communications on a V2X wireless channel. In some V2X wireless communications systems, a V2X device may be limited to reserving a certain number of resources on a wireless channel based on a channel busy ratio (CBR) of the wireless channel. For example, if the CBR is between 60% and 80%, a V2X UE may be limited to reserving up to 30 subchannels to transmit an application packet on the V2X wireless channel. The V2X UE may attempt to reserve resources for an initial transmission of the application packet and a retransmission of the application packet using the 30 subchannels. However, in some cases, the application packet may use more resources than the limited number of subchannels of resources to schedule both the initial transmission and the retransmission. Therefore, the V2X UE may attempt to schedule and transmit both the initial transmission and the retransmission, but there may only be enough resources available on the channel for complete transmission of the initial transmission. Requiring the UE to schedule resources for both the initial transmission and a retransmission at the same time may reduce performance when limited resources are available on a busy channel.

A wireless communications system described herein supports techniques for a UE to ensure a reliable initial transmission if there are insufficient resources for both the initial transmission and a retransmission. For example, when a UE has a message (e.g., an application packet) to transmit on a V2X wireless channel, the UE may determine the CBR of the wireless channel and determine a channel reservation limit based on the CBR. If the UE is limited to a number of available resources such that the UE cannot reserve sufficient resources for both the initial transmission and the retransmission, the UE may not reserve resources for the retransmission in order to ensure a reliable initial transmission and reduce packet loss from a partial retransmission. The UE may then reserve resources for the initial transmission, and the UE may transmit the application packet using the resources for the initial transmission.

Aspects of the disclosure are initially described in the context of wireless communications systems. Aspects of the disclosure are further illustrated by and described with reference to apparatus diagrams, system diagrams, and flowcharts that relate to resource selection under congested conditions.

Figure 1:
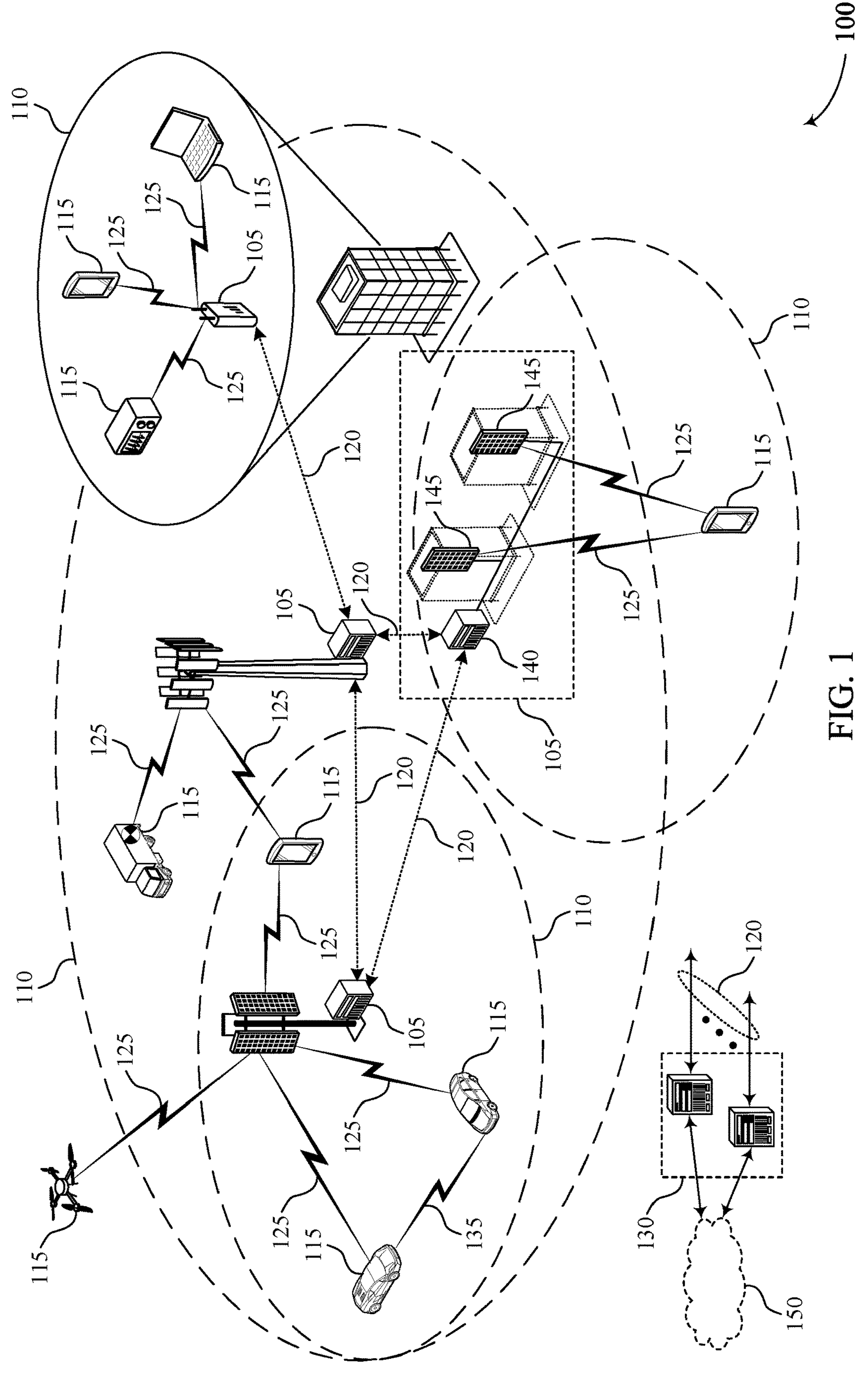
FIG. 1 illustrates an example of a system for wireless communications that supports resource selection under congested conditions in accordance with aspects of the present disclosure.

FIG. 1 illustrates an example of a wireless communications system 100 that supports resource selection under congested conditions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s-1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a ULE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communication systems may V2X communications. In some V2X systems, a V2X device, such as a UE 115, may reserve resources for communications on a V2X wireless channel. In some V2X wireless communications systems, a V2X device may be limited to reserving a certain number of resources on a wireless channel based on a CBR of the wireless channel. The V2X device may attempt to reserve resources for an initial transmission of the application packet and a retransmission of the application packet using the available resources. However, in some cases, an initial transmission and a retransmission may use more resources than the limited number of subchannels available, which may affect the retransmission and increase packet loss.

Wireless communications systems described herein, such as the wireless communications system 100, support techniques for a UE 115 to ensure a reliable initial transmission and reduce packet loss if there are insufficient resources for both the initial transmission and the retransmission. For example, when a UE 115 has a message (e.g., an application packet) to transmit on a V2X wireless channel, the UE 115 may determine the CBR of the wireless channel and determine a channel reservation limit based on the CBR. If the UE 115 is limited to a number of available resources such that the UE 115 cannot reserve sufficient resources for both the initial transmission and the retransmission, the UE 115 may not reserve resources for the retransmission in order to ensure there are enough resources for a reliable initial transmission. The UE 115 may instead reserve resources for the initial transmission alone, and the UE 115 may transmit the application packet using the resources for the initial transmission.

Figure 2:
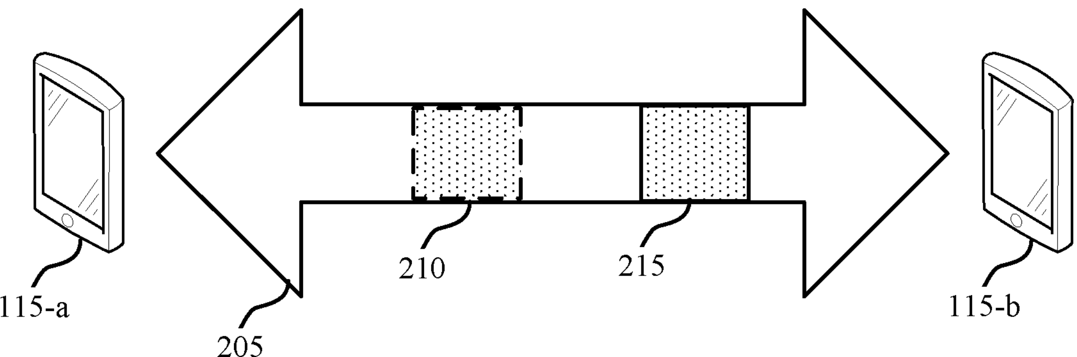
FIG. 2 illustrates an example of a wireless communications system that supports resource selection under congested conditions in accordance with aspects of the present disclosure.
Figure 2:

FIG. 2 illustrates an example of a wireless communications system 200 that supports resource selection under congested conditions in accordance with aspects of the present disclosure. In some examples, wireless communications system 200 may implement aspects of wireless communications system 100. The wireless communications system includes UE 115-*a* and UE 115-*b*, which may each be an example of a UE 115 as described with reference to FIG. 1.

The wireless communications system 200 may be an example of a V2X wireless communication system. For example, UE 115-*a* and UE 115-*b* may be examples of vehicular UEs 115 (e.g., V-UEs), pedestrian UEs 115 (e.g., P-UEs), or some other example of a device operating in a V2X wireless communications system.

V2X devices in the wireless communications system 200 may communicate on a wireless channel 205. In some cases, the wireless channel 205 may be a V2X wireless channel or a sidelink wireless channel. A V2X device, such as UE 115-*a* or UE 115-*b*, may reserve resources on the wireless channel 205 to communicate messages. For example, UE 115-*a* may identify an application packet for transmission to UE 115-*b*, and UE 115-*a* may reserve a first resource 210 for an initial transmission of the application packet and a second resource 215 for a retransmission of the application packet.

In some cases, a V2X device may be limited to reserving a certain number of resources on the wireless channel 205 based on a CBR of the wireless channel 205. For example, UE 115-*a* may measure a CBR of the wireless channel 205. UE 115-*a* may measure a reference signal strength indicator (RSSI) of the wireless channel and determine a fraction or percentage of sub-channels of the wireless channel 205 which exceed a configured threshold.

The measured CBR may indicate a channel occupancy reservation limit, or a channel reservation limit, corresponding to a number of subchannels that UE 115-*a* can reserve for a duration of time. In some cases, the channel reservation limit may be based on a priority of a message UE 115-*a* is to send over the wireless channel 205. For example, for an application packet (e.g., with a ProSe per-packet priority (PPPP) of PPPP3 through PPPP5), if the measured CBR is between 60% and 80%, UE 115-*a* may be able to reserve up to 30 sub-channels over a 1 second duration. If the measured CBR is between 80% and 100%, UE 115-*a* may be able to reserve up to 20 sub-channels over a 1 second duration for the application packet. Higher priority packets may have less stringent channel reservation limits, while lower priority packets may have more stringent channel reservation limits.

UE 115-*a* may attempt to reserve the first resource 210 and the second resource 215 for the initial transmission and retransmission of the application packet, but UE 115-*a* may not have sufficient resources based on the channel reservation limit. For example, the first resource 210 and the second resource 215 may use, together, 40 sub-channels for the initial transmission and retransmission. However, UE 115-*a* may be limited to reserving 30 sub-channels, so UE 115-*a* may not have sufficient resources available. Requiring the UE to schedule resources for both the initial transmission and a retransmission at the same time may increase latency and reduce performance when fewer resources are available on a busy channel. In some cases, UE 115-*a* attempting to schedule resources for both the initial transmission and the retransmission may affect the quality of the application packet, and UE 115-*b* may not be able to successfully decode or receive both the initial transmission and the retransmission. For example, a packet error rate of the transmission may greatly increase in congested conditions when UE 115-*a* is subject to a channel reservation limit. In some cases, UE 115-*a* may not be able to transmit all information of the retransmission, as UE 115-*a* may be limited from reserving sufficient resources for the retransmission.

The wireless communications system 200 may support techniques for a UE 115, such as UE 115-*a* or UE 115-*b*, to ensure a reliable initial transmission if there are insufficient resources for both the initial transmission and a retransmission. For example, when UE 115-*a* has a message (e.g., an application packet) to transmit on the wireless channel 205 to UE 115-*b*, UE 115-*a* may determine the CBR of the wireless channel 205 and determine a channel reservation limit based on the CBR. If UE 115-*a* is limited to a number of available resources such that UE 115-*a* cannot reserve sufficient resources for both the initial transmission and the retransmission, UE 115-*a* may not reserve the second resources 215 for the retransmission. UE 115-*a* may then reserve the first resources 210 for the initial transmission, and UE 115-*a* may transmit the application packet using the first resources 210 for the initial transmission. This may decrease a packet error rate of the signaling.

UE 115-*a* may determine the channel reservation limit and determine whether there are sufficient resources for the initial transmission and retransmission based on the channel reservation limit. For example, UE 115-*a* may calculate the overall resources available for retransmission using Equation (1).

$$\text{Available subchannels}=\text{Floor}[\text{CR\_limit\_subchan}*\text{SPS}_{period}/1000\text{ ms}/2] \quad (1)$$

In some cases, the channel reservation limit may be based on a semi-periodic signaling (SPS) period. In an example, the SPS period may be 100 milliseconds. If the channel reservation limit is 30 subchannels, there may be one available subchannel. In this example, there may not be enough subchannels for retransmission, so UE 115-*a* may reserve just the first resource 210 for the initial transmission. If the channel reservation limit is 20, there may be one available subchannel, so UE 115-*a* may reserve just the first resource 210 for the initial transmission. If the channel reservation is 150, there may be seven available subchannels, so UE 115-*a* may be able to reserve the first resource 210 for the initial transmission and the second resource 215 for the retransmission.

In some cases, UE 115-*a* may detect reserved resources within the duration which includes both past resources and future reserved resources. For example, UE 115-*a* may determine a number of reserved resources within a first duration of past resources and a second duration of future resources. In some cases, UE 115-*a* may detect the number of resources within a last 900 milliseconds and a number of reserved resources within the next 100 milliseconds. In this way, UE 115-*a* may determine the number of available subchannels based on both used subchannels and granted subchannels. For example, the number of available subchannels may be based on channel occupancy reservation limit minus the number of used subchannels (e.g., in the past portion of the window) and minus the number of granted subchannels (e.g., in the future portion of the window). In some cases, UE 115-*a* may detect the resources granted in the future portion of the window based on receiving signaling indicating the resources in the future portion, such as by receiving control information or sidelink control information indicating future reserved resources. In some cases, when evaluating the future portion of the window, UE 115-*a* may consider, or count, higher PPPP signaling. For example, UE 115-*a* may exclude a reserved transmission (e.g., an initial transmission and a retransmission) of the same SPS flow or UE 115-*a*'s own transmissions.

In some cases, UE 115-*a* may evaluate the channel occupancy ratio limit at multiple points. For example, at a time of a first (e.g., initial) transmission, UE 115-*a* may determine if the available number of subchannels is sufficient for the initial transmission. If the number of subchannels required for the initial transmission exceeds the channel occupancy ratio limit, UE 115-*a* may drop the initial transmission. If there are sufficient subchannels available for the initial transmission, UE 115-*a* may transmit the initial transmission. Then, at a time for a retransmission of the initial transmission, UE 115-*a* may again evaluate the channel occupancy ratio limit. If there are sufficient resources available for the retransmission. If there are sufficient resources for the retransmission, UE 115-*a* may send the retransmission of the initial transmission. If there are insufficient resources available for the retransmission, UE 115-*a* may drop the retransmission.

The granted subchannels may correspond to resources which are reserved for transmission (e.g., in future resources) by UE 115-*a* or by other UEs 115. The granted subchannels may be reserved for event-driven transmissions. In some cases, an event-driven transmission may be a one-time transmission, such as dynamic signaling. For example, the event-driven transmission may not be an SPS transmissions. In some cases, an event-driven transmission may be higher priority signaling, which may be based on having a higher PPPP.

When considering granted subchannels to determine the number of available subchannels, UE 115-*a* may determine the number of available subchannels based on Equation (2), where CR_limit_subch corresponds to a channel reservation limit or a channel occupancy ratio limit, used_subchannels corresponds to a number of subchannels in a past portion of the window, and granted_subchannels corresponds to a number of subchannels reserved in a future portion of the window.

$$\text{Available subchannels} = (\text{CR\_limit\_subch} - \text{Used\_subchannels} - \text{granted\_subchannels} \tag{2}$$

In some examples, UE 115-*a* may determine different channel occupancy ratio limits. In some cases, the different channel occupancy ratio limits may correspond to different thresholds or tolerances for a channel occupancy ratio. For example, UE 115-*a* may determine a channel occupancy ratio limit using Equation (3) or Equation (4). The determined channel occupancy ratio limits, packet_limit_subch_1 and packet_limit_subch_2, respectively, may each be an example of CR_limit_subch in Equation (2).

$$\text{packet\_limit\_subch\_1} = \text{Floor}[\text{CR\_limit\_subch} * \text{SPS\_Period}/1000\text{ ms} \tag{3}$$

$$\text{packet\_limit\_subch\_2} = \text{Floor}[\text{CR\_limit\_subch} * \text{SPS\_Period}/1000\text{ ms}/2 \tag{4}$$

For example, UE 115-*a* may have a pending SPS transmission with a first number of resource blocks for an initial transmission and a second number of resource blocks for a retransmission. If the number of available subchannels from Equation (2) is large enough for both the first number of resource blocks and the second number of resource blocks using the channel occupancy ratio limit from Equation (3), UE 115-*a* may reserve resources for both the initial transmission and the retransmission. If not, but the number of available subchannels from Equation (2) is large enough using the channel occupancy ratio limit from Equation (4), UE 115-*a* may reserve only resources for the initial transmission. If not, but UE 115-*a* selects an MCS for the first number of resource blocks within a range of pre-configured subchannels, UE 115-*a* reserve resources for the initial transmission. If none of these conditions can be met, UE 115-*a* may drop the initial transmission and the retransmission. In this way, UE 115-*a* may check multiple conditions to reserve resources for the initial transmission and retransmission, and UE 115-*a* may adaptively increase or decrease the number of reserved resources based on which conditions can be met.

Figure 3:
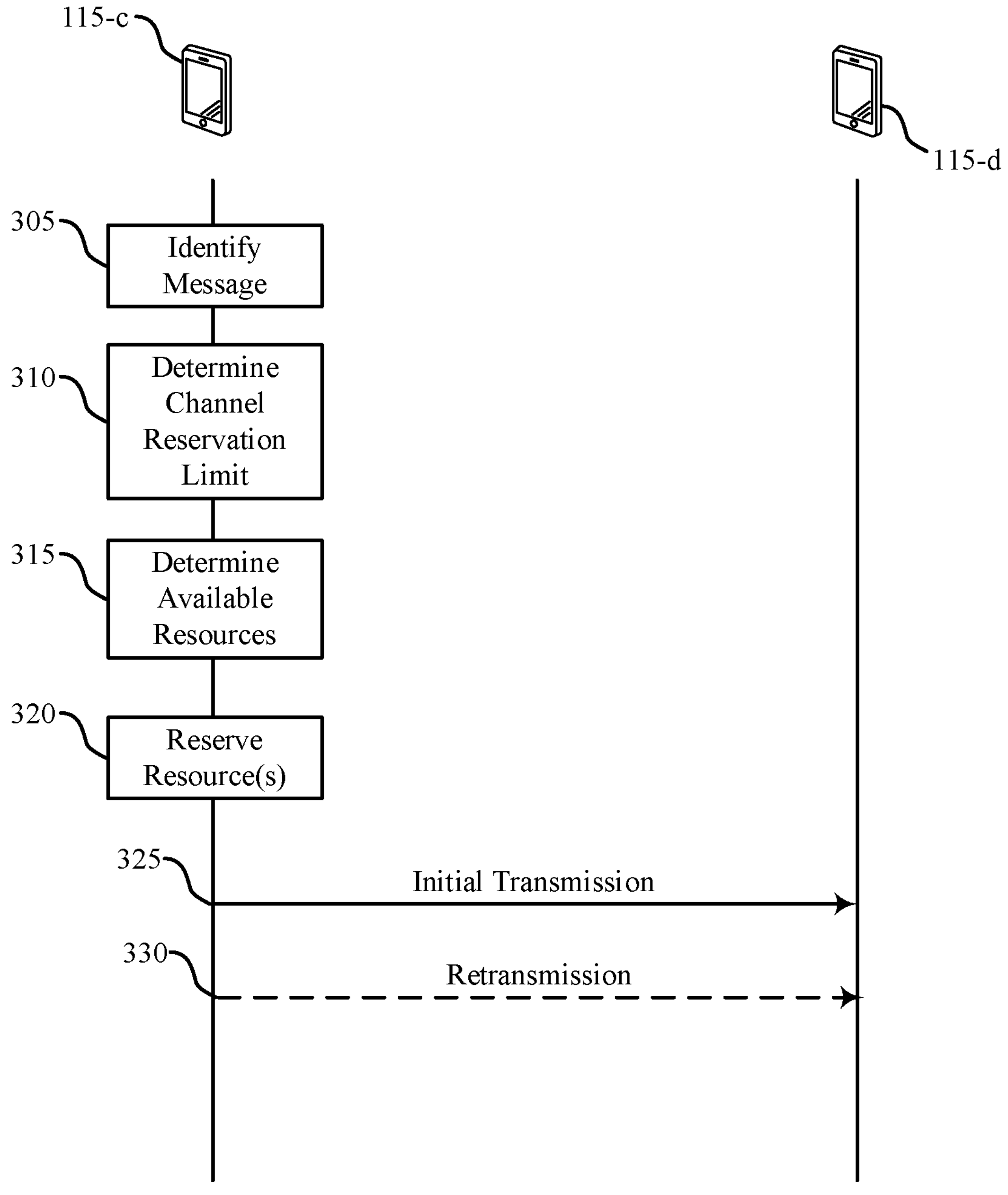
FIG. 3 illustrates an example of a process flow that supports resource selection under congested conditions in accordance with aspects of the present disclosure.

FIG. 3 illustrates an example of a process flow 300 that supports resource selection under congested conditions in accordance with aspects of the present disclosure. In some examples, the process flow 300 may implement aspects of wireless communications system 100. The process flow 300 may be implemented by UE 115-*c* and UE 115-*d*, which may each be an example of a UE 115 described with reference to FIGS. 1 and 2. In some cases, UE 115-*c* and UE 115-*d* may be examples of V2X devices, such as V-UEs, P-UEs, transmission and reception points (TRPs), roadside units, or other devices operating in in a V2X communication system.

At 305, UE 115-*c* may identify a message to be transmitted over a wireless channel. For example, UE 115-*c* may identify an application packet to be transmitted over a V2X wireless channel, or a sidelink, to UE 115-*d*. In some cases, the message may be associated with a certain priority. For example, the message may be associated with PPPP3 through PPPP5.

In some cases, UE 115-*c* may determine a CBR for the wireless channel based on an RSSI measurement of the wireless channel. At 310, UE 115-*c* may determine a channel reservation limit for reserving resources on the wireless channel for the message based on the CBR for the wireless channel. The channel reservation limit may correspond to a number of subchannels that a wireless device such as UE 115-*c* is permitted to reserve for transmission for a duration of time. For example, UE 115-*c* may be limited to reserving 150 subchannels, 30 subchannels, or 20 subchannels over a 1 second duration. In some cases, if the CBR is very low (e.g., below 30%), UE 115-*c* may not have a channel reservation limit for the wireless channel.

At 315, UE 115-*c* may determine that available resources are insufficient for both an initial transmission of the message and a retransmission of the message based on the channel reservation limit. For example, UE 115-*c* may be able to reserve up to 30 subchannels, but the initial transmission and the retransmission may each use 40 subchannels. If UE 115-*c* were to attempt to reserve a resource for the retransmission, UE 115-*c* may not be able to transmit all of the information for the retransmission, which may result in packet loss and an increased packet error rate. Therefore, UE 115-*c* may reserve resources for the initial transmission and not the retransmission.

At 320, UE 115-*c* may reserve a resource on the wireless channel for the initial transmission of the message based on the available resources being insufficient for both the initial transmission of the message and the retransmission of the message. In some cases, UE 115-*c* may refrain from reserving a resource for the retransmission of the message.

At 325, UE 115-*c* may transmit the message to UE 115-*d* on the wireless channel on the resource. In some cases, if UE 115-*c* reserved a resource for the retransmission, UE 115-*c* may transmit the retransmission at 330.

Figure 4:
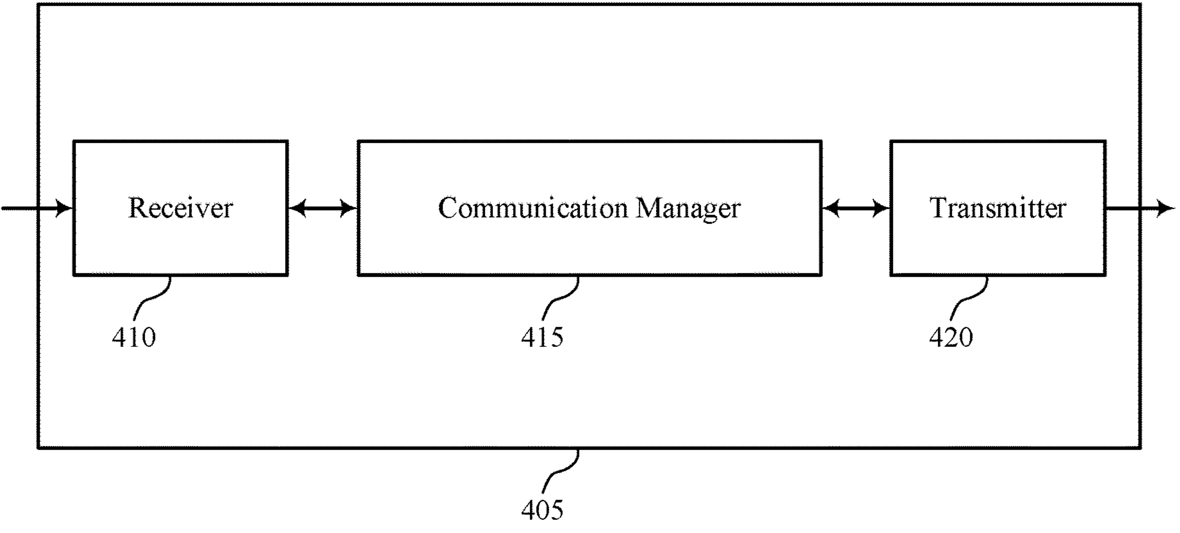
FIGS. 4 and 5 show block diagrams of devices that support resource selection under congested conditions in accordance with aspects of the present disclosure.

FIG. 4 shows a block diagram 400 of a device 405 that supports resource selection under congested conditions in accordance with aspects of the present disclosure. The device 405 may be an example of aspects of a UE 115 as described herein. The device 405 may include a receiver 410, a communication manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to resource selection under congested conditions, etc.). Information may be passed on to other components of the device 405. The receiver 410 may be an example of aspects of the transceiver 715 described with reference to FIG. 7. The receiver 410 may utilize a single antenna or a set of antennas.

The communication manager 415 may identify a message to be transmitted over a wireless channel, determine a channel reservation limit for reserving resources on the wireless channel for the message based on a channel busy ratio for the wireless channel, determine that available resources are insufficient for both an initial transmission of the message and a retransmission of the message based on the channel reservation limit, and reserve a resource on the wireless channel for the initial transmission of the message based on the available resources being insufficient for both the initial transmission of the message and the retransmission of the message. The communication manager 415 may be an example of aspects of the communication manager 710 described herein.

The communication manager 415, or its sub-components, may be implemented in hardware, code (e.g., software or firmware) executed by a processor, or any combination thereof. If implemented in code executed by a processor, the functions of the communication manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 415, or its sub-components, may be physically located at various positions, including being distributed such that portions of functions are implemented at different physical locations by one or more physical components. In some examples, the communication manager 415, or its sub-components, may be a separate and distinct component in accordance with various aspects of the present disclosure. In some examples, the communication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 415 as described herein may be implemented to realize one or more potential advantages. One implementation may allow a UE 115 to reduce packet loss. For example, instead of reserving a resource for an initial transmission and a resource for a partial retransmission, the UE 115 may reserve resources for just the initial transmission. In some cases, if the UE 115 is limited from reserving sufficient resources for the retransmission, the UE 115 may be able to transmit just a portion of the information of the retransmission, which may not be decodable or successfully received by a receiving device. Additionally, these techniques may improve spectral efficiency. For example, if the UE 115 reserves resources for the initial transmission and not the retransmission, resources which would be reserved by the UE 115 for the retransmission may be used by other wireless devices. In some cases, refraining from reserving resources for the retransmission may reduce a CBR of the wireless channel.

The transmitter 420 may transmit signals generated by other components of the device 405. In some examples, the transmitter 420 may be collocated with a receiver 410 in a transceiver module. For example, the transmitter 420 may be an example of aspects of the transceiver 715 described with reference to FIG. 7. The transmitter 420 may utilize a single antenna or a set of antennas.

Figure 5:
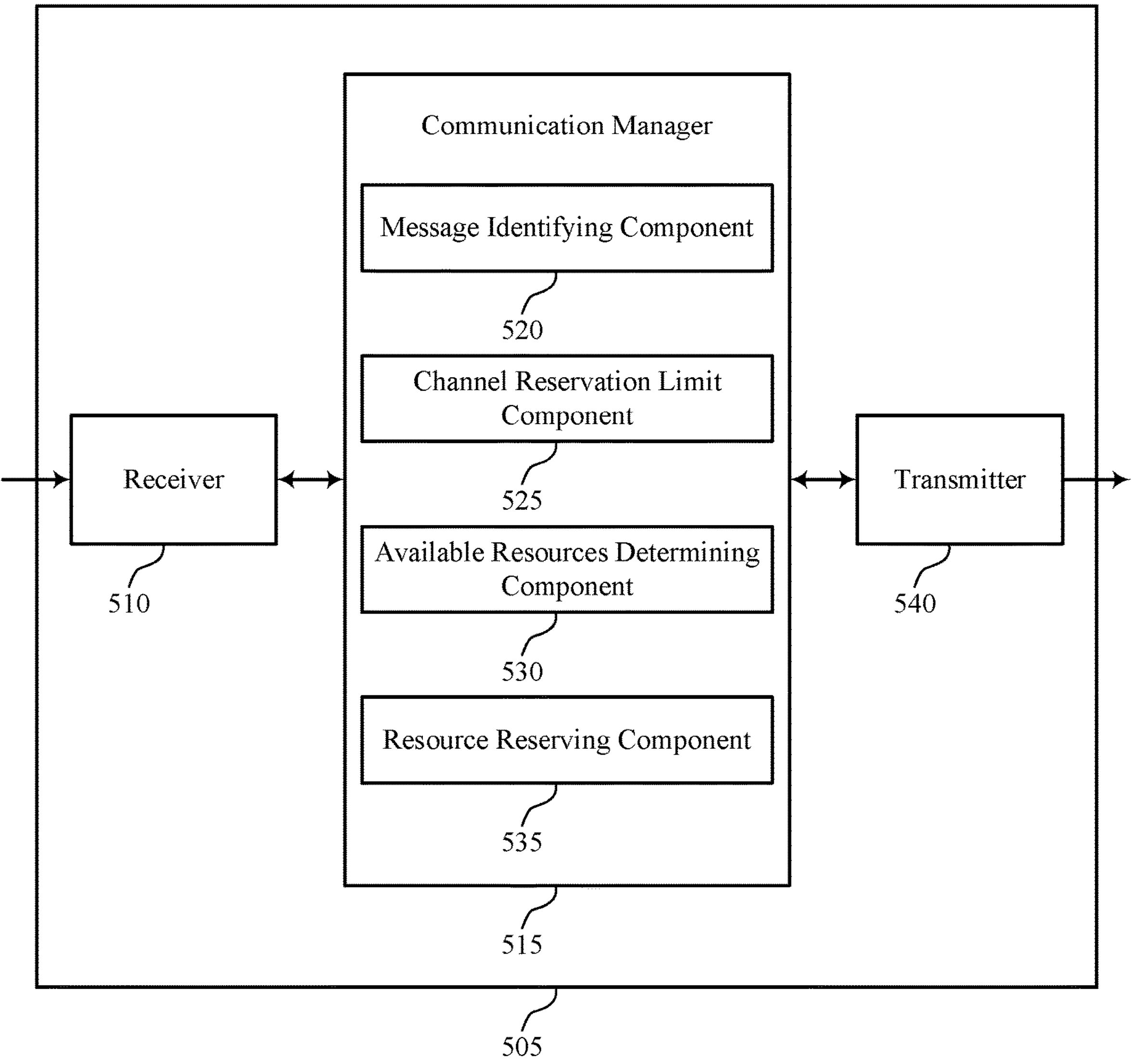

FIG. 5 shows a block diagram 500 of a device 505 that supports resource selection under congested conditions in accordance with aspects of the present disclosure. The device 505 may be an example of aspects of a device 405, or a UE 115 as described herein. The device 505 may include a receiver 510, a communication manager 515, and a transmitter 540. The device 505 may also include a processor.

Each of these components may be in communication with one another (e.g., via one or more buses).

The receiver 510 may receive information such as packets, user data, or control information associated with various information channels (e.g., control channels, data channels, and information related to resource selection under congested conditions, etc.). Information may be passed on to other components of the device 505. The receiver 510 may be an example of aspects of the transceiver 715 described with reference to FIG. 7. The receiver 510 may utilize a single antenna or a set of antennas.

The communication manager 515 may be an example of aspects of the communication manager 415 as described herein. The communication manager 515 may include a message identifying component 520, a channel reservation limit component 525, an available resources determining component 530, and a resource reserving component 535. The communication manager 515 may be an example of aspects of the communication manager 710 described herein.

The message identifying component 520 may identify a message to be transmitted over a wireless channel. The channel reservation limit component 525 may determine a channel reservation limit for reserving resources on the wireless channel for the message based on a channel busy ratio for the wireless channel.

The available resources determining component 530 may determine that available resources are insufficient for both an initial transmission of the message and a retransmission of the message based on the channel reservation limit. The resource reserving component 535 may reserve a resource on the wireless channel for the initial transmission of the message based on the available resources being insufficient for both the initial transmission of the message and the retransmission of the message.

The transmitter 540 may transmit signals generated by other components of the device 505. In some examples, the transmitter 540 may be collocated with a receiver 510 in a transceiver module. For example, the transmitter 540 may be an example of aspects of the transceiver 715 described with reference to FIG. 7. The transmitter 540 may utilize a single antenna or a set of antennas.

Figure 6:
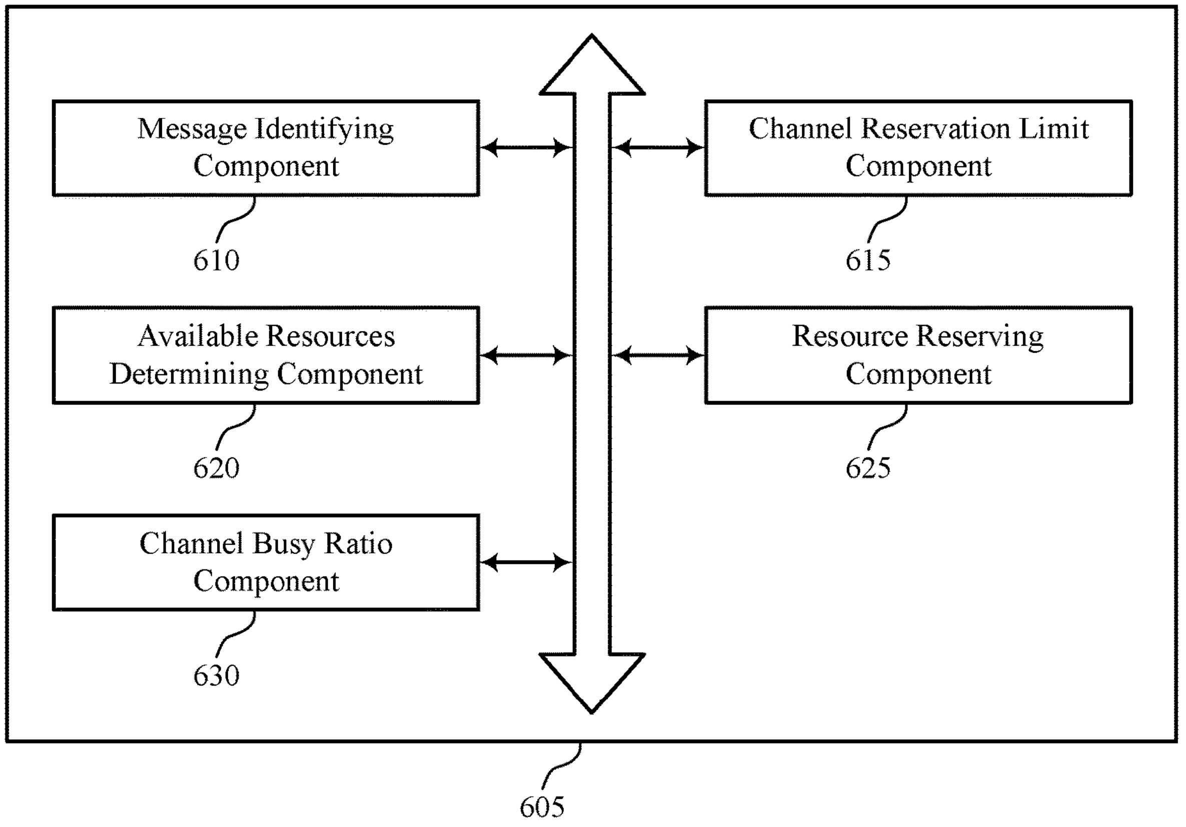
FIG. 6 shows a block diagram of a communication manager that supports resource selection under congested conditions in accordance with aspects of the present disclosure.

FIG. 6 shows a block diagram 600 of a communication manager 605 that supports resource selection under congested conditions in accordance with aspects of the present disclosure. The communication manager 605 may be an example of aspects of a communication manager 415, a communication manager 515, or a communication manager 710 described herein. The communication manager 605 may include a message identifying component 610, a channel reservation limit component 615, an available resources determining component 620, a resource reserving component 625, and a channel busy ratio component 630. Each of these modules may communicate, directly or indirectly, with one another (e.g., via one or more buses).

The message identifying component 610 may identify a message to be transmitted over a wireless channel. In some cases, the wireless channel includes a V2X channel. The channel reservation limit component 615 may determine a channel reservation limit for reserving resources on the wireless channel for the message based on a channel busy ratio for the wireless channel.

The available resources determining component 620 may determine that available resources are insufficient for both an initial transmission of the message and a retransmission of the message based on the channel reservation limit. In some examples, the available resources determining component 620 may determine a number of available subchannels for the message based on the channel reservation limit. In some examples, the available resources determining component 620 may determine the number of available subchannels is insufficient for both the initial transmission of the message and the retransmission of the message. In some cases, the available resources determining component 620 may determine the number of available subchannels for the message based on granted resources for one or more event-driven transmissions. In some examples, the available resources determining component 620 may determine the number of available subchannels for the message based on a channel occupancy ratio within a channel occupancy ratio evaluation window, the channel occupancy ratio evaluation window including a first portion of past resources and a second portion of future resources.

In some examples, the available resources determining component 620 may determining a first number of available subchannels for the message based on a first channel reservation limit. The available resources determining component 620 may determine the first number of available subchannels is insufficient for both the initial transmission of the message and the retransmission of the message. The available resources determining component 620 may determine a second number of available subchannels for the message based a second channel reservation limit and the first number of available subchannels being insufficient, and the available resources determining component 620 may determine the second number of available subchannels is insufficient for both the initial transmission of the message and the retransmission of the message but is sufficient for the initial transmission of the message.

The resource reserving component 625 may reserve a resource on the wireless channel for the initial transmission of the message based on the available resources being insufficient for both the initial transmission of the message and the retransmission of the message. In some examples, the resource reserving component 625 may refrain from reserving a retransmission resource based on determining that available resources are insufficient. The channel busy ratio component 630 may determine the channel busy ratio for the wireless channel based on a received signal strength indicator measurement of the wireless channel.

Figure 7:
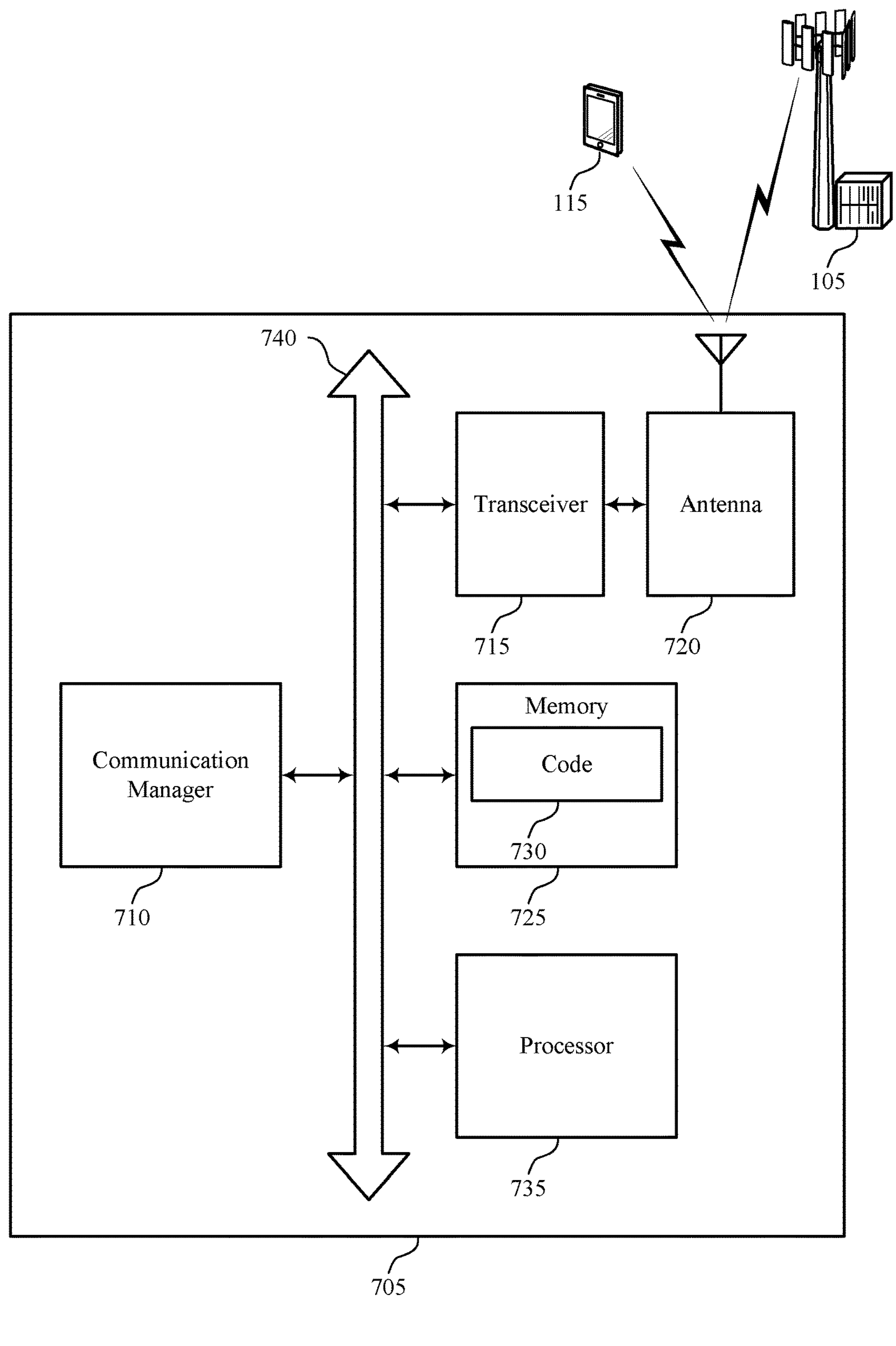
FIG. 7 shows a diagram of a system including a device that supports resource selection under congested conditions in accordance with aspects of the present disclosure.

FIG. 7 shows a diagram of a system 700 including a device 705 that supports resource selection under congested conditions in accordance with aspects of the present disclosure. The device 705 may be an example of or include the components of device 405, device 505, or a UE 115 as described herein. The device 705 may include components for bi-directional voice and data communications including components for transmitting and receiving communications, including a communication manager 710, a transceiver 715, an antenna 720, memory 725, and a processor 735. These components may be in electronic communication via one or more buses (e.g., bus 740).

The communication manager 710 may identify a message to be transmitted over a wireless channel, determine a channel reservation limit for reserving resources on the wireless channel for the message based on a channel busy ratio for the wireless channel, determine that available resources are insufficient for both an initial transmission of the message and a retransmission of the message based on the channel reservation limit, and reserve a resource on the wireless channel for the initial transmission of the message based on the available resources being insufficient for both the initial transmission of the message and the retransmission of the message.

The transceiver 715 may communicate bi-directionally, via one or more antennas, wired, or wireless links as described above. For example, the transceiver 715 may represent a wireless transceiver and may communicate bi-directionally with another wireless transceiver. The transceiver 715 may also include a modem to modulate the packets and provide the modulated packets to the antennas for transmission, and to demodulate packets received from the antennas.

In some cases, the wireless device may include a single antenna 720. However, in some cases the device may have more than one antenna 720, which may be capable of concurrently transmitting or receiving multiple wireless transmissions.

The memory 725 may include RAM and ROM. The memory 725 may store computer-readable, computer-executable code 730 including instructions that, when executed, cause the processor to perform various functions described herein. In some cases, the memory 725 may contain, among other things, a BIOS which may control basic hardware or software operation such as the interaction with peripheral components or devices.

The code 730 may include instructions to implement aspects of the present disclosure, including instructions to support wireless communications. The code 730 may be stored in a non-transitory computer-readable medium such as system memory or other type of memory. In some cases, the code 730 may not be directly executable by the processor 735 but may cause a computer (e.g., when compiled and executed) to perform functions described herein.

The processor 735 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 735 may be configured to operate a memory array using a memory controller. In other cases, a memory controller may be integrated into the processor 735. The processor 735 may be configured to execute computer-readable instructions stored in a memory (e.g., the memory 725) to cause the device 705 to perform various functions (e.g., functions or tasks supporting resource selection under congested conditions).

Figure 8:
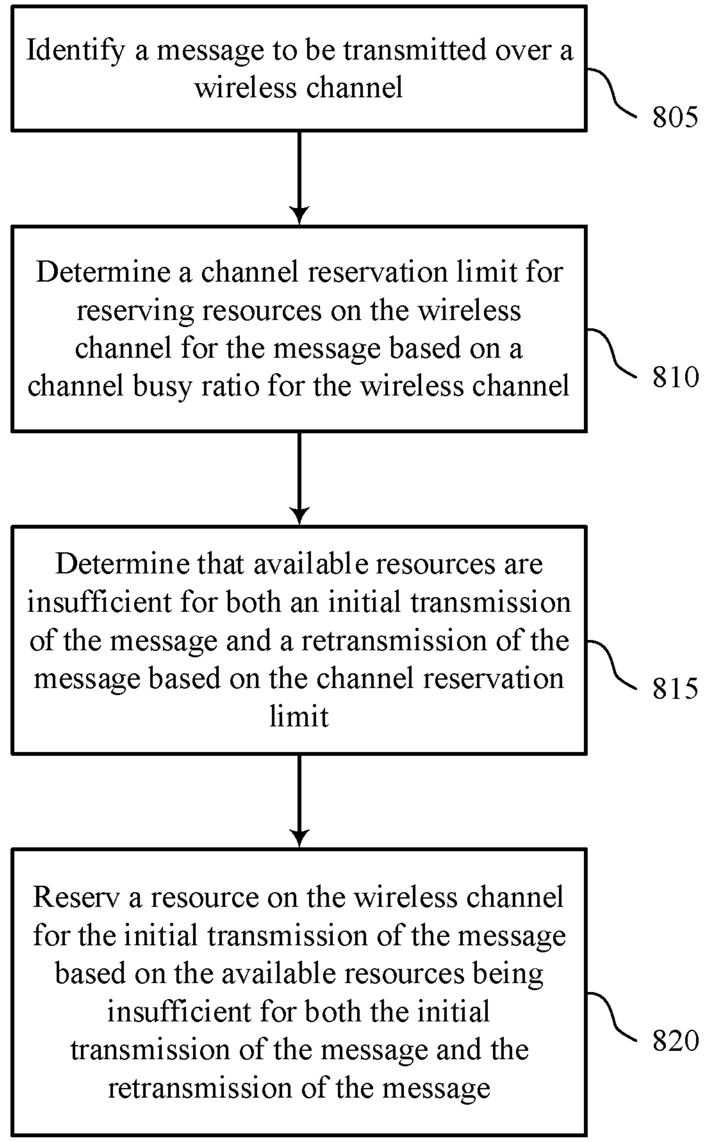
FIGS. 8 and 9 show flowcharts illustrating methods that support resource selection under congested conditions in accordance with aspects of the present disclosure.

FIG. 8 shows a flowchart illustrating a method 800 that supports resource selection under congested conditions in accordance with aspects of the present disclosure. The operations of method 800 may be implemented by a UE 115 or its components as described herein. For example, the operations of method 800 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 805, the UE may identify a message to be transmitted over a wireless channel. The operations of 805 may be performed according to the methods described herein. In some examples, aspects of the operations of 805 may be performed by a message identifying component as described with reference to FIGS. 4 through 7.

At 810, the UE may determine a channel reservation limit for reserving resources on the wireless channel for the message based on a channel busy ratio for the wireless channel. The operations of 810 may be performed according to the methods described herein. In some examples, aspects of the operations of 810 may be performed by a channel reservation limit component as described with reference to FIGS. 4 through 7.

At 815, the UE may determine that available resources are insufficient for both an initial transmission of the message and a retransmission of the message based on the channel reservation limit. The operations of 815 may be performed according to the methods described herein. In some examples, aspects of the operations of 815 may be performed by an available resources determining component as described with reference to FIGS. 4 through 7.

At 820, the UE may reserve a resource on the wireless channel for the initial transmission of the message based on the available resources being insufficient for both the initial transmission of the message and the retransmission of the message. The operations of 820 may be performed according to the methods described herein. In some examples, aspects of the operations of 820 may be performed by a resource reserving component as described with reference to FIGS. 4 through 7.

Figure 9:
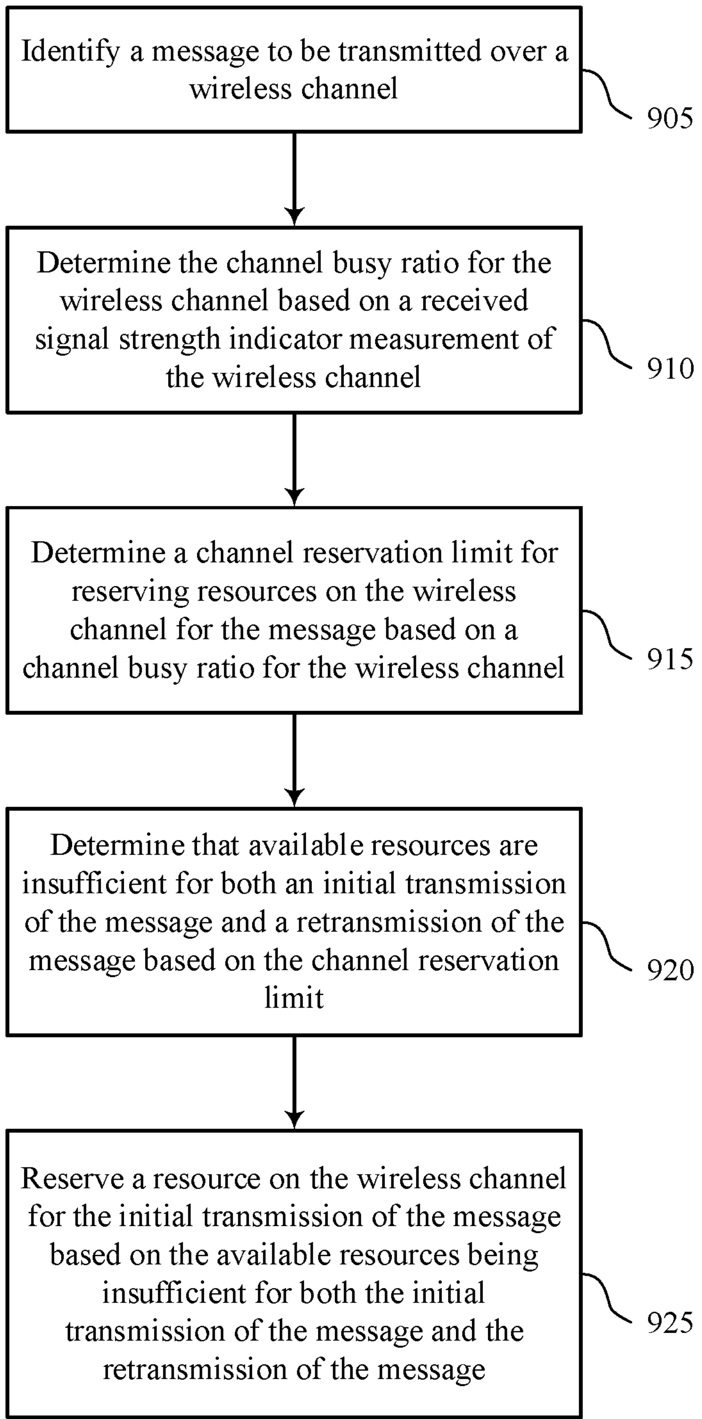

FIG. 9 shows a flowchart illustrating a method 900 that supports resource selection under congested conditions in accordance with aspects of the present disclosure. The operations of method 900 may be implemented by a UE 115 or its components as described herein. For example, the operations of method 900 may be performed by a communication manager as described with reference to FIGS. 4 through 7. In some examples, a UE may execute a set of instructions to control the functional elements of the UE to perform the described functions. Additionally or alternatively, a UE may perform aspects of the described functions using special-purpose hardware.

At 905, the UE may identify a message to be transmitted over a wireless channel. The operations of 905 may be performed according to the methods described herein. In some examples, aspects of the operations of 905 may be performed by a message identifying component as described with reference to FIGS. 4 through 7.

At 910, the UE may determine the channel busy ratio for the wireless channel based on a received signal strength indicator measurement of the wireless channel. The operations of 910 may be performed according to the methods described herein. In some examples, aspects of the operations of 910 may be performed by a channel busy ratio component as described with reference to FIGS. 4 through 7.

At 915, the UE may determine a channel reservation limit for reserving resources on the wireless channel for the message based on a channel busy ratio for the wireless channel. The operations of 915 may be performed according to the methods described herein. In some examples, aspects of the operations of 915 may be performed by a channel reservation limit component as described with reference to FIGS. 4 through 7.

At 920, the UE may determine that available resources are insufficient for both an initial transmission of the message and a retransmission of the message based on the channel reservation limit. The operations of 920 may be performed according to the methods described herein. In some examples, aspects of the operations of 920 may be performed by an available resources determining component as described with reference to FIGS. 4 through 7.

At 925, the UE may reserve a resource on the wireless channel for the initial transmission of the message based on the available resources being insufficient for both the initial transmission of the message and the retransmission of the message. The operations of 925 may be performed according to the methods described herein. In some examples, aspects of the operations of 925 may be performed by a resource reserving component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying a message to be transmitted over a wireless channel; determining a channel reservation limit for reserving resources on the wireless channel for the message based at least in part on a channel busy ratio for the wireless channel; determining that available resources are insufficient for both an initial transmission of the message and a retransmission of the message based at least in part on the channel reservation limit; and reserving a resource on the wireless channel for the initial transmission of the message based at least in part on the available resources being insufficient for both the initial transmission of the message and the retransmission of the message.

Aspect 2: The method of aspect 1, wherein determining that available resources are insufficient comprises: determining a number of available subchannels for the message based at least in part on the channel reservation limit; and determining the number of available subchannels is insufficient for both the initial transmission of the message and the retransmission of the message.

Aspect 3: The method of aspect 2, wherein determining that available resources are insufficient comprises: determining the number of available subchannels for the message based at least in part on granted resources for one or more event-driven transmissions.

Aspect 4: The method of any of aspects 2 through 3, wherein determining that available resources are insufficient comprises: determining the number of available subchannels for the message based at least in part on a channel occupancy ratio within a channel occupancy ratio evaluation window, the channel occupancy ratio evaluation window comprising a first portion of past resources and a second portion of future resources.

Aspect 5: The method of any of aspects 1 through 4, wherein determining that available resources are insufficient comprises: determining a first number of available subchannels for the message based at least in part on a first channel reservation limit; determining the first number of available subchannels is insufficient for both the initial transmission of the message and the retransmission of the message; determining a second number of available subchannels for the message based at least in part on a second channel reservation limit and the first number of available subchannels being insufficient; and determining the second number of available subchannels is insufficient for both the initial transmission of the message and the retransmission of the message but is sufficient for the initial transmission of the message.

Aspect 6: The method of any of aspects 1 through 5, further comprising: determining the channel busy ratio for the wireless channel based at least in part on a received signal strength indicator measurement of the wireless channel.

Aspect 7: The method of any of aspects 1 through 6, wherein the channel reservation limit is based at least in part on a priority of the message.

Aspect 8: The method of any of aspects 1 through 7, wherein the channel reservation limit corresponds to a number of subchannels that a wireless device is permitted to reserve for transmission for a duration of time.

Aspect 9: The method of any of aspects 1 through 8, wherein the available resources are determined based at least in part on a duration of a semi-persistent scheduling period and the channel reservation limit.

Aspect 10: The method of any of aspects 1 through 9, further comprising: refraining from reserving a retransmission resource based at least in part on determining that available resources are insufficient.

Aspect 11: The method of any of aspects 1 through 10, wherein the wireless channel comprises a vehicle-to-everything (V2X) channel.

Aspect 12: An apparatus for wireless communications at a UE, comprising a processor; memory coupled with the processor; and instructions stored in the memory and executable by the processor to cause the apparatus to perform a method of any of aspects 1 through 11.

Aspect 13: An apparatus for wireless communications at a UE, comprising at least one means for performing a method of any of aspects 1 through 11.

Aspect 14: A non-transitory computer-readable medium storing code for wireless communications at a UE, the code comprising instructions executable by a processor to perform a method of any of aspects 1 through 11.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

- identifying a message to be transmitted over a wireless channel;
- determining a first channel reservation limit for reserving resources on the wireless channel for the message based at least in part on a channel busy ratio for the wireless channel;
- determining a first quantity of available subchannels for the message based at least in part on the first channel reservation limit;
- determining that the first quantity of available resources is insufficient for both an initial transmission of the message and a retransmission of the message based at least in part on the first channel reservation limit;
- determining a second quantity of available subchannels for the message based at least in part on a second channel reservation limit and the first quantity of available resources being insufficient for both the initial transmission and the retransmission;
- determining the second quantity of available subchannels is insufficient for both the initial transmission and the retransmission of the message but is sufficient for the initial transmission of the message; and
- reserving a resource on the wireless channel for only the initial transmission of the message based at least in part on the second quantity of available resources being insufficient for both the initial transmission of the message and the retransmission of the message but sufficient for the initial transmission of the message.

2. The method of claim 1, wherein determining that the first quantity of available resources is insufficient comprises:

- determining the first quantity of available subchannels for the message based at least in part on granted resources for one or more event-driven transmissions.

3. The method of claim 1, wherein determining that the first quantity of available resources is insufficient comprises:

- determining the first quantity of available subchannels for the message based at least in part on a channel occupancy ratio within a channel occupancy ratio evaluation window, the channel occupancy ratio evaluation window comprising a first portion of past resources and a second portion of future resources.

4. The method of claim 1, further comprising:

- determining the channel busy ratio for the wireless channel based at least in part on a received signal strength indicator measurement of the wireless channel.

5. The method of claim 1, wherein the first channel reservation limit is based at least in part on a priority of the message.

6. The method of claim 1, wherein the first channel reservation limit corresponds to a number of subchannels that a wireless device is permitted to reserve for transmission for a duration of time.

7. The method of claim 1, wherein the first quantity of available resources is determined based at least in part on a duration of a semi-persistent scheduling period and the first channel reservation limit.

8. The method of claim 1, further comprising:
refraining from reserving a retransmission resource based at least in part on determining that first quantity of available resources is insufficient.

9. The method of claim 1, wherein the wireless channel comprises a vehicle-to-everything (V2X) channel.

10. An apparatus for wireless communications at a user equipment (UE), comprising:
at least one processor,
at least one memory coupled with the at least one processor, and
instructions stored in the at least one memory and executable by the at least one processor to cause the apparatus to:
identify a message to be transmitted over a wireless channel;
determine a first channel reservation limit for reserving resources on the wireless channel for the message based at least in part on a channel busy ratio for the wireless channel;
determine a first quantity of available subchannels for the message based at least in part on the first channel reservation limit;
determine that the first quantity of available resources is insufficient for both an initial transmission of the message and a retransmission of the message based at least in part on the first channel reservation limit;
determine a second quantity of available subchannels for the message based at least in part on a second channel reservation limit and the first quantity of available resources being insufficient for both the initial transmission and the retransmission;
determine the second quantity of available subchannels is insufficient for both the initial transmission and the retransmission of the message but is sufficient for the initial transmission of the message; and
reserve a resource on the wireless channel for only the initial transmission of the message based at least in part on the second quantity of available resources being insufficient for both the initial transmission of the message and the retransmission of the message but sufficient for the initial transmission of the message.

11. The apparatus of claim 10, wherein the instructions to determine that the first quantity of available resources is insufficient are executable by the at least one processor to cause the apparatus to:
determine the first quantity of available subchannels for the message based at least in part on granted resources for one or more event-driven transmissions.

12. The apparatus of claim 10, wherein the instructions to determine that the first quantity of available resources is insufficient are executable by the at least one processor to cause the apparatus to:
determine the first quantity of available subchannels for the message based at least in part on a channel occupancy ratio within a channel occupancy ratio evaluation window, the channel occupancy ratio evaluation window comprising a first portion of past resources and a second portion of future resources.

13. The apparatus of claim 10, wherein the instructions are further executable by the at least one processor to cause the apparatus to:
determine the channel busy ratio for the wireless channel based at least in part on a received signal strength indicator measurement of the wireless channel.

14. The apparatus of claim 10, wherein the first channel reservation limit is based at least in part on a priority of the message.

15. The apparatus of claim 10, wherein the first channel reservation limit corresponds to a number of subchannels that a wireless device is permitted to reserve for transmission for a duration of time.

16. The apparatus of claim 10, wherein the first quantity of available resources is determined based at least in part on a duration of a semi-persistent scheduling period and the first channel reservation limit.

17. The apparatus of claim 10, wherein the instructions are further executable by the at least one processor to cause the apparatus to:
refrain from reserving a retransmission resource based at least in part on determining that first quantity of available resources is insufficient.

18. The apparatus of claim 10, wherein the wireless channel comprises a vehicle-to-everything (V2X) channel.

19. An apparatus for wireless communications at a user equipment (UE), comprising:
means for identifying a message to be transmitted over a wireless channel;
means for determining a first channel reservation limit for reserving resources on the wireless channel for the message based at least in part on a channel busy ratio for the wireless channel;
means for determining a first quantity of available subchannels for the message based at least in part on the first channel reservation limit;
means for determining that the first quantity of available resources is insufficient for both an initial transmission of the message and a retransmission of the message based at least in part on the first channel reservation limit;
means for determining a second quantity of available subchannels for the message based at least in part on a second channel reservation limit and the first quantity of available resources being insufficient for both the initial transmission and the retransmission;
means for determining the second quantity of available subchannels is insufficient for both the initial transmission and the retransmission of the message but is sufficient for the initial transmission of the message; and
means for reserving a resource on the wireless channel for only the initial transmission of the message based at least in part on the second quantity of available resources being insufficient for both the initial transmission of the message and the retransmission of the message but sufficient for the initial transmission of the message.

20. The apparatus of claim 19, wherein the means for determining that the first quantity of available resources is insufficient comprises:

means for determining the first quantity of available subchannels for the message based at least in part on granted resources for one or more event-driven transmissions.

21. The apparatus of claim 19, wherein the means for determining that the first quantity of available resources is insufficient comprises:

means for determining the first quantity of available subchannels for the message based at least in part on a channel occupancy ratio within a channel occupancy ratio evaluation window, the channel occupancy ratio evaluation window comprising a first portion of past resources and a second portion of future resources.

22. The apparatus of claim 19, further comprising:

means for determining the channel busy ratio for the wireless channel based at least in part on a received signal strength indicator measurement of the wireless channel.

23. The apparatus of claim 19, wherein the first channel reservation limit is based at least in part on a priority of the message.

24. A non-transitory computer-readable medium storing code for wireless communications at a user equipment (UE), the code comprising instructions executable by a processor to:

identify a message to be transmitted over a wireless channel;

determine a first channel reservation limit for reserving resources on the wireless channel for the message based at least in part on a channel busy ratio for the wireless channel;

determine a first quantity of available subchannels for the message based at least in part on the first channel reservation limit;

determine that the first quantity of available resources is insufficient for both an initial transmission of the message and a retransmission of the message based at least in part on the first channel reservation limit;

determine a second quantity of available subchannels for the message based at least in part on a second channel reservation limit and the first quantity of available resources being insufficient for both the initial transmission and the retransmission;

determine the second quantity of available subchannels is insufficient for both the initial transmission and the retransmission of the message but is sufficient for the initial transmission of the message; and reserve a resource on the wireless channel for only the initial transmission of the message based at least in part on the second quantity of available resources being insufficient for both the initial transmission of the message and the retransmission of the message but sufficient for the initial transmission of the message.

* * * * *